United States Patent
Bodla et al.

(10) Patent No.: US 10,277,096 B2
(45) Date of Patent: Apr. 30, 2019

(54) SYSTEM FOR THERMAL MANAGEMENT IN ELECTRICAL MACHINES

(71) Applicant: General Electric Company, Schenectady, NY (US)

(72) Inventors: Karthik Kumar Bodla, Watervliet, NY (US); Joo Han Kim, Niskayuna, NY (US); Yogen Vishwas Utturkar, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 203 days.

(21) Appl. No.: 15/070,333

(22) Filed: Mar. 15, 2016

(65) Prior Publication Data
US 2017/0141654 A1   May 18, 2017

Related U.S. Application Data

(63) Continuation-in-part of application No. 14/940,712, filed on Nov. 13, 2015.

(51) Int. Cl.
*H02K 9/20* (2006.01)
(52) U.S. Cl.
CPC .................................... *H02K 9/20* (2013.01)
(58) Field of Classification Search
CPC ...................................................... H02K 9/20
USPC .............................. 310/52–64, 215, 156.12
See application file for complete search history.

(56) References Cited

U.S. PATENT DOCUMENTS

| | | | |
|---|---|---|---|
| 3,801,843 A * | 4/1974 | Corman | F28D 15/0275 165/104.25 |
| 4,921,041 A | 5/1990 | Akachi | |
| 6,672,373 B2 | 1/2004 | Smyrnov | |
| 9,178,401 B2 * | 11/2015 | Sugita | H02K 9/20 |
| 2005/0180109 A1 | 8/2005 | Miyazaki et al. | |
| 2008/0073066 A1 | 3/2008 | Chang et al. | |

(Continued)

FOREIGN PATENT DOCUMENTS

| | | | |
|---|---|---|---|
| JP | 02225666 A | * | 9/1990 |
| WO | 2014202474 A1 | | 12/2014 |

OTHER PUBLICATIONS

Peng et a;, "Application of high-temperature permanent magnets Sm(Co, Fe, Cu, Zr)Z in PPM focusing system", Journal of Rare Earths, vol. 26, No. 5, Oct. 2008, p. 731.*

(Continued)

*Primary Examiner* — John K Kim
(74) *Attorney, Agent, or Firm* — GE Global Patent Operation; Nitin N. Joshi

(57) ABSTRACT

A component for an electrical machine is disclosed. The component is a stator and/or a rotor. The component includes a core, a magnetic field-generating component, and an oscillating heat pipe assembly. The core includes a plurality of slots and the magnetic field-generating component is disposed in at least one slot of the plurality of slots. The oscillating heat pipe assembly is disposed in the core and the at least one slot of the plurality of slots. The oscillating heat pipe assembly is in contact with the core and the magnetic field-generating component. The oscillating heat pipe assembly includes a dielectric material, and where the oscillating heat pipe assembly has an in-plane thermal conductivity higher than a through-plane thermal conductivity.

18 Claims, 11 Drawing Sheets

(56) References Cited

U.S. PATENT DOCUMENTS

| | | | |
|---|---|---|---|
| 2008/0197724 A1* | 8/2008 | Cullen | H02K 3/24 310/53 |
| 2011/0067843 A1 | 3/2011 | Vasiliev, Jr. | |
| 2011/0127870 A1* | 6/2011 | Onda | H02K 1/278 310/156.12 |
| 2011/0309695 A1* | 12/2011 | Huard | H02K 3/24 310/46 |
| 2012/0097369 A1 | 4/2012 | Agostini et al. | |
| 2014/0265660 A1* | 9/2014 | Kulkarni | H02K 9/19 310/54 |
| 2015/0280526 A1* | 10/2015 | Chamberlin | H02K 9/22 310/54 |
| 2015/0288255 A1* | 10/2015 | Barker | H02K 1/32 310/43 |
| 2017/0141654 A1* | 5/2017 | Bodla | H02K 9/20 |
| 2017/0141655 A1* | 5/2017 | Bodla | H02K 9/22 |

OTHER PUBLICATIONS

Karimi G. et al., "Review and assessment of Pulsating Heat Pipe mechanism for high heat flux electronic cooling", Thermal and Thermomechanical Phenomena in Electronic Systems, 2004. ITHERM '04. The Ninth Intersociety Conference on, vol. 2, pp. 52-59, 2004.
Semidey S. A. et al., "Experimentation of an Electric Machine Technology Demonstrator Incorporating Direct Winding Heat Exchangers", Industrial Electronics, IEEE Transactions on, vol. 61, Issue: 10, pp. 5771-5778, Oct. 2014.

* cited by examiner

SYSTEM FOR THERMAL MANAGEMENT IN ELECTRICAL MACHINES

CROSS REFERENCE TO RELATED APPLICATIONS

This application is a continuation-in-part of U.S. application Ser. No. 14/940,712 filed on Nov. 13, 2015.

BACKGROUND

The present disclosure relates generally to electrical machines, and more particularly to thermal management in such electrical machines.

Higher temperatures in electrical machines may be a source of performance degradation, decrease in power density, and reduction in reliability for the electrical machines. Thermal "hot spots" may be a specific manifestation of such an issue. Components of the electrical machines, for example, a stator and a rotor include elements, such as cores, conductors disposed in slots, and/or poles. One or more such elements are generally insulated through insulation layers (e.g., ground wall, phase separators, conductor coating, VPI resin, and the like) to protect them from short circuit. Further, one or more such elements are often among the hottest portions in the electrical machines, due to large ohmic losses. For example, the majority of ohmic losses in the stator component, such as copper losses, are concentrated in stator slots due to generation of heat by winding conductors disposed in the stator slots.

Heat generated due to ohmic losses within the components need to be transmitted through the insulation layers. The extraction of heat from such areas may not be effective due to the poor thermal conductivity of the various insulation layers.

Accordingly, there is a need for an enhanced thermal management in electrical machines.

BRIEF DESCRIPTION

In accordance with one embodiment, a component of an electrical machine is disclosed. In accordance with aspects of the present technique, the component includes a core, a magnetic field-generating component, and an oscillating heat pipe assembly. The core includes a plurality of slots and the magnetic field-generating component is disposed in at least one slot of the plurality of slots. The oscillating heat pipe assembly is disposed in the core and the at least one slot of the plurality of slots. The oscillating heat pipe assembly is in contact with the core and the magnetic field-generating component. The oscillating heat pipe assembly includes a dielectric material, and where the oscillating heat pipe assembly has an in-plane thermal conductivity higher than a through-plane thermal conductivity.

In accordance with another embodiment, a component of an electrical machine is disclosed. In accordance with aspects of the present technique, the component includes a magnetic core, a conduction winding, and an oscillating heat pipe assembly. The magnetic core includes teeth defining a plurality of slots, where each slot of the plurality of slots is defined between corresponding pair of adjacent teeth. The conduction winding is disposed in at least one slot of the plurality of slots. The oscillating heat pipe assembly is disposed proximate to the conduction winding and the magnetic core. The oscillating heat pipe assembly includes a dielectric material, and where the oscillating heat pipe assembly has an in-plane thermal conductivity higher than a through-plane thermal conductivity.

In accordance with yet another embodiment, an electrical machine is disclosed. In accordance with aspects of the present technique, the electrical machine includes a stator, a rotor, and an oscillating heat pipe assembly. The stator includes a stator core and a conduction winding. The stator core further includes a plurality of stator slots and the conduction winding is disposed in at least one slot of the plurality of stator slots. The rotor includes a rotor core and a permanent magnet. The rotor core further includes a plurality of rotor slots and the permanent magnet is disposed in at least one slot of the plurality of rotor slots. The oscillating heat pipe assembly is disposed in the stator core, the at least one slot of the plurality of stator slots, the rotor core, and the at least one slot of the plurality of rotor slots. The oscillating heat pipe assembly is in contact with the stator core, the rotor core, the conduction winding, and the permanent magnet. Further, the oscillating heat pipe assembly includes a dielectric material, and where the oscillating heat pipe assembly has an in-plane thermal conductivity higher than a through-plane thermal conductivity.

DRAWINGS

These and other features and aspects of embodiments of the present technique will become better understood when the following detailed description is read with reference to the accompanying drawings in which like characters represent like parts throughout the drawings, wherein.

DETAILED DESCRIPTION

Figure 1:
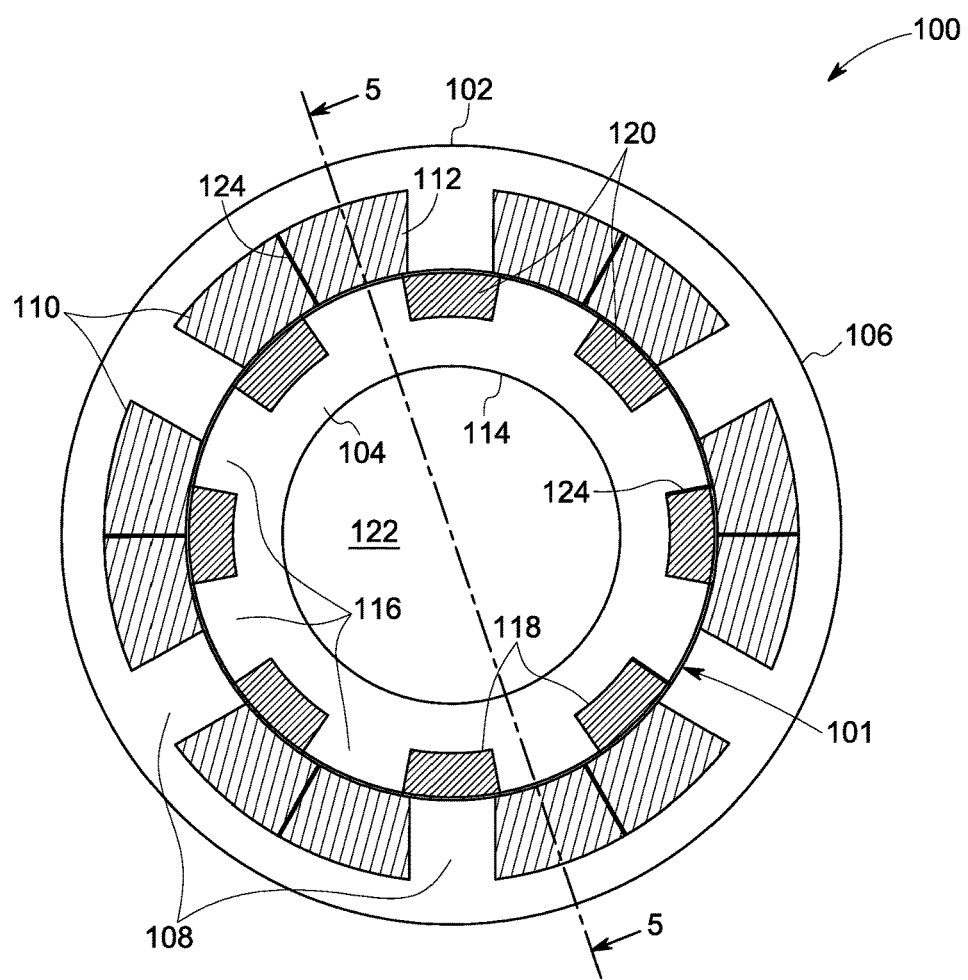
FIG. 1 is a schematic sectional view of a radial flux electrical machine, in accordance with aspects of the present technique.

Embodiments discussed herein disclose a component of an electrical machine. In one or more embodiments, the electrical machine includes a static component (stator) and a movable component (rotor) positioned proximate to each other, where the movable component is configured to move relative to the static component. The electrical machine further includes an oscillating heat pipe assembly disposed proximate to a magnetic field-generating component and/or a core of the component and such oscillating heat pipe assembly is configured to dissipate heat away from the component.

According to some embodiments of the present technique, a component of the electrical machine is at least one of a stator and a rotor. The component, in one example, is the stator including a stator core (magnetic core) having a plurality of stator slots defined between a corresponding pair of stator teeth of the stator core. The component, in another example, is the rotor including a rotor core (magnetic core) having a plurality of rotor slots defined between a corresponding pair of rotor teeth of the rotor core. The component further includes a magnetic field-generating component disposed in at least one slot of the plurality of stator slots or in at least one slot of the plurality of rotor slots. The component further includes an oscillating heat pipe assembly configured to dissipate heat from the component. In certain embodiments, the oscillating heat pipe assembly is disposed in the magnetic core of the stator and the rotor. In particular, the oscillating heat pipe assembly may be disposed in at least one slot of the plurality of stator slots, and in at least one slot of the plurality of rotor slots. In embodiments where the oscillating heat pipe assembly is disposed in the magnetic core of the stator and the rotor, the oscillating heat pipe assembly is disposed such that the oscillating heat pipe assembly is directly or indirectly in contact with the magnetic field-generating component.

In certain embodiments, the oscillating heat pipe assembly includes a dielectric material and has an in-plane thermal conductivity that is higher than a through-plane thermal conductivity. As used herein, the term "magnetic field-generating component" refers to an element that induces/generates magnetic field during operation of the electrical machine. In some embodiments, the magnetic field-generating component includes a conductive winding that includes a plurality of coils which are electrically conductive. In one example, the conductive winding may include a copper winding. In some other embodiments, the magnetic field-generating component may include a permanent magnet.

In one or more embodiments, the oscillating heat pipe assembly is configured to dissipate heat from the core and the magnetic field-generating component of the component for effective thermal management of the electrical machines.

According to some embodiments of the present technique, the oscillating heat pipe assembly is a flexible heat pipe and is made of dielectric material. Consequently, the oscillating heat pipe assembly of the present technique may be easily bent to conform to various shapes of the component. Further, the dielectric material of the heat pipe allows the oscillating heat pipe assembly to be disposed along with the magnetic core without adversely affecting (e.g., short circuiting) the components of the electrical machine.

FIG. 1 illustrates a schematic sectional view of an electrical machine 100 in accordance with one exemplary embodiment of the present technique. In the illustrated embodiment, the electrical machine 100 is a radial flux electrical machine. The electrical machine 100 includes a stator 102, and a rotor 104 disposed concentric to the stator 102 such that a thin air gap (not shown in FIG. 1) is established between the stator 102 and the rotor 104. In the illustrated embodiment, rotor 104 rotates relative to the stator 102. In some embodiments, the electrical machine 100 may be an electrical motor, wherein the rotor 104 moves relative to the stator 102 to convert electrical energy to mechanical energy. Alternatively, is some other embodiments, the electrical machine 100 may be an electrical generator, wherein the motion of the rotor 104 relative to the stator 102, converts mechanical energy to electrical energy. In some embodiments, the rotor 104 is disposed within a stator 102. In some other embodiments, the stator 102 is disposed within a rotor 104. According to some embodiments of the present technique, the stator 102 and/or a rotor 104 are generally referred as a component 101 of the electrical machine 100.

The stator 102 includes a stator core 106. In one or more embodiments, the stator core 106 includes stator teeth 108 defining a plurality of stator slots 110. Each stator slot of the plurality of stator slots 110 is defined between corresponding pair of adjacent stator teeth 108. The stator 102 further includes a conduction winding 112 disposed at least in one stator slot 110. The rotor 104 includes a rotor core 114. In one or more embodiments, the rotor core 114 includes rotor teeth 116 defining a plurality of rotor slots 118. Each rotor slot of the plurality of rotor slots 118 is defined between corresponding pair of adjacent rotor teeth 116. The rotor 104 further includes a permanent magnet 120 disposed at least in one rotor slot 118. In one or more embodiments, the rotor 104 is mounted on a shaft 122 and is configured to be driven by the rotor 104. The electrical machine 100 further includes a cooling jacket (not shown in FIG. 1) disposed on an outer surface (not shown in FIG. 1) of the stator 102.

In one embodiment, an oscillating heat pipe assembly 124 is disposed in at least one slot of the plurality of stator slots 110 such that the slot 110 in which the oscillating heat pipe assembly 124 is disposed includes both the conduction winding 112 and the oscillating heat pipe assembly 124. Similarly, the oscillating heat pipe assembly 124 is disposed in at least one slot of the plurality of rotor slots 118 such that the particular slot 118 includes both the permanent magnet 120 and the oscillating heat pipe assembly 124. In some embodiments, the oscillating heat pipe assembly 124 is disposed internal to the conduction winding 112 (i.e. along with a plurality of coils of the conduction winding 112) or the permanent magnet 120. In certain embodiments, each of the corresponding stator slots 110 may include the conduction winding 112 and the oscillating heat pipe assembly 124 and each of the corresponding rotor slots 118 may include the permanent magnet 120 and the oscillating heat pipe assembly 124.

Figure 5:
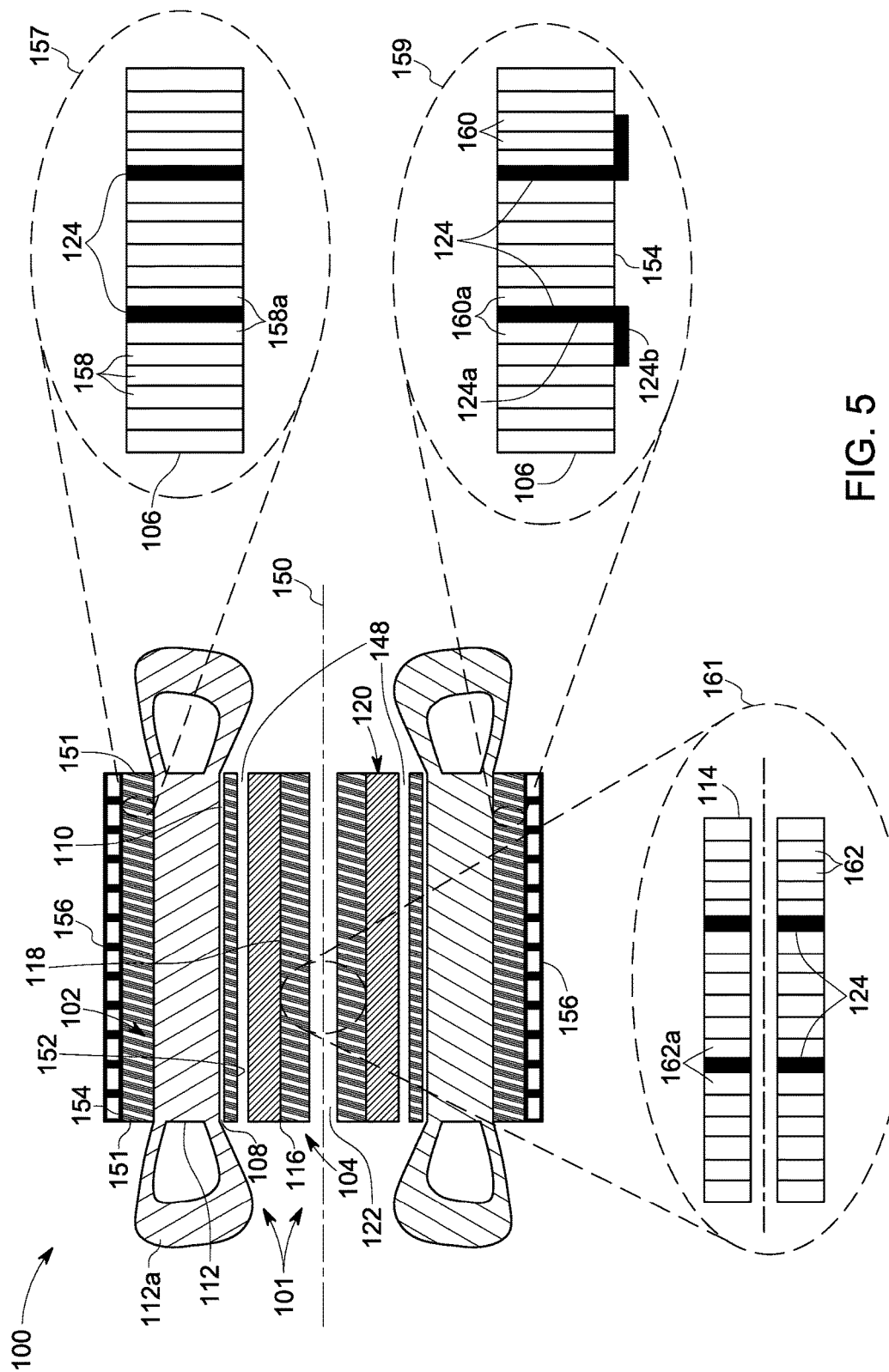
FIG. 5 is a schematic sectional view of a portion of the electrical machine taken along line 5-5 of FIG. 1, in accordance with aspects of the present technique.

In one embodiment, the oscillating heat pipe assembly 124 is disposed in the stator core 106 and the rotor core 114 (as shown in FIG. 5). Specifically, the oscillating heat pipe assembly 124 is inter-disposed between a pair of lamination sheets of a plurality of lamination sheets of the stator core 106. Similarly, the oscillating heat pipe assembly 124 is inter-disposed between a pair of lamination sheets of a plurality of lamination sheets of the rotor core 114.

Figure 2:
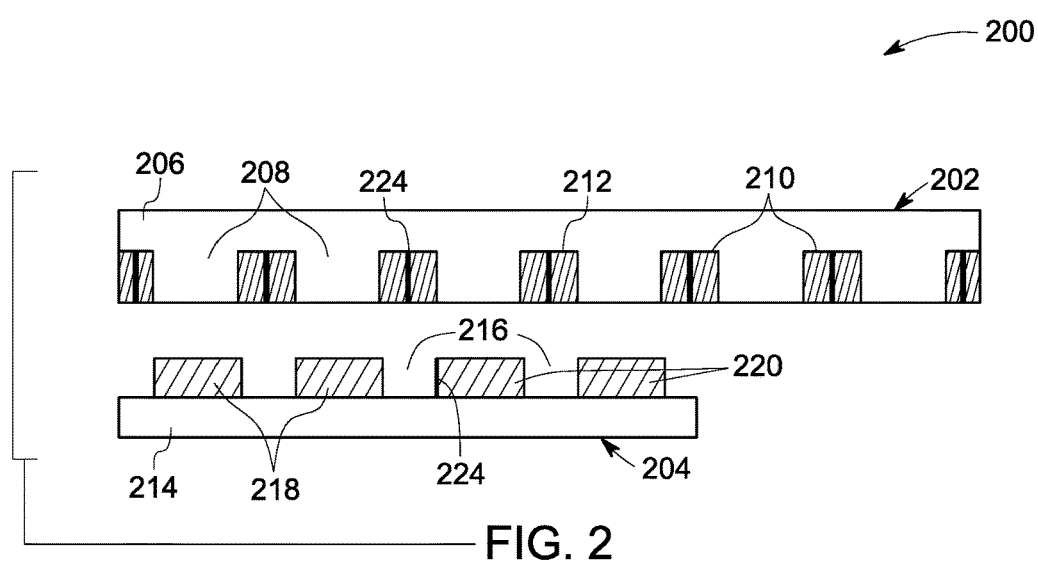
FIG. 2 is a schematic sectional view of a linear electrical machine, in accordance with aspects of the present technique.

FIG. 2 shows a schematic sectional view of an electrical machine 200 in accordance with another exemplary embodiment of the present technique. In the illustrated embodiment, the electrical machine 200 is a linear electrical machine. The electrical machine 200 includes a stator 202 and a rotor 204. The rotor 204 is movable along an axial direction relative to the stator 202. The stator 202 includes a stator core 206 having stator teeth 208 with stator slots 210 defined there between. The rotor 204 includes a rotor core 214 having rotor teeth 216 with rotor slots 218 defined there between.

In one embodiment, the stator core 206 and the rotor core 214 includes a plurality of lamination sheets (not shown in FIG. 2). In such embodiments, an oscillating heat pipe assembly 224 (not shown in the FIG. 2) may be inter-disposed between a pair of lamination sheets of the plurality of lamination sheets of the stator core 206 and the rotor core 214. Further, at least one stator slot 210 includes a conduction winding 212 and the oscillating heat pipe assembly 224 contacting the conduction winding 212. Similarly, at least one rotor slot 218 includes a permanent magnet 220 and the oscillating heat pipe assembly 224 contacting the permanent magnet 220. In some embodiments, the rotor 204 and the stator 202 are disposed axially adjacent to one another.

Figure 3:
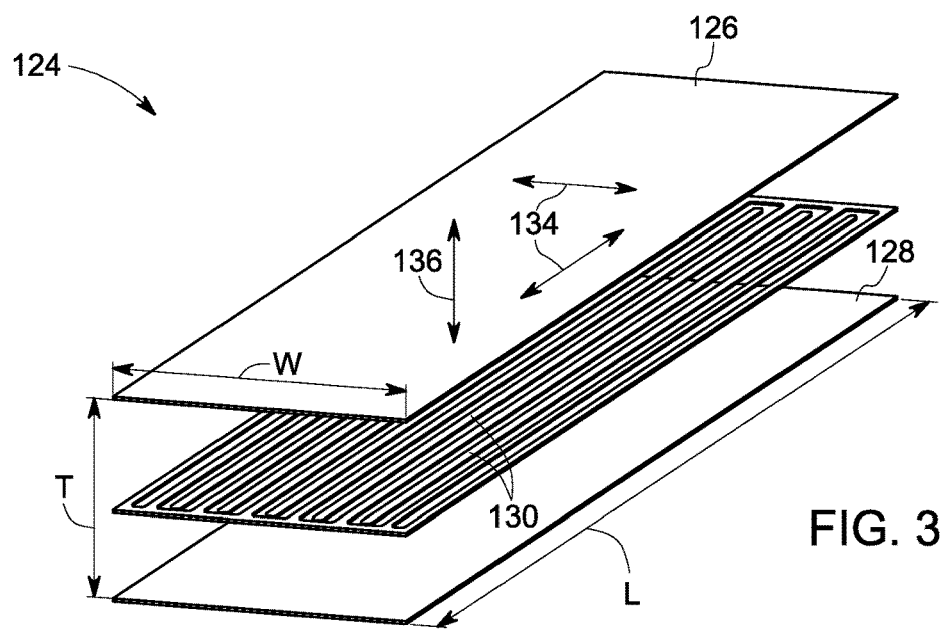
FIG. 3 is an exploded perspective view of an oscillating heat pipe assembly of FIG. 1, in accordance with aspects of the present technique.
Figure 4:
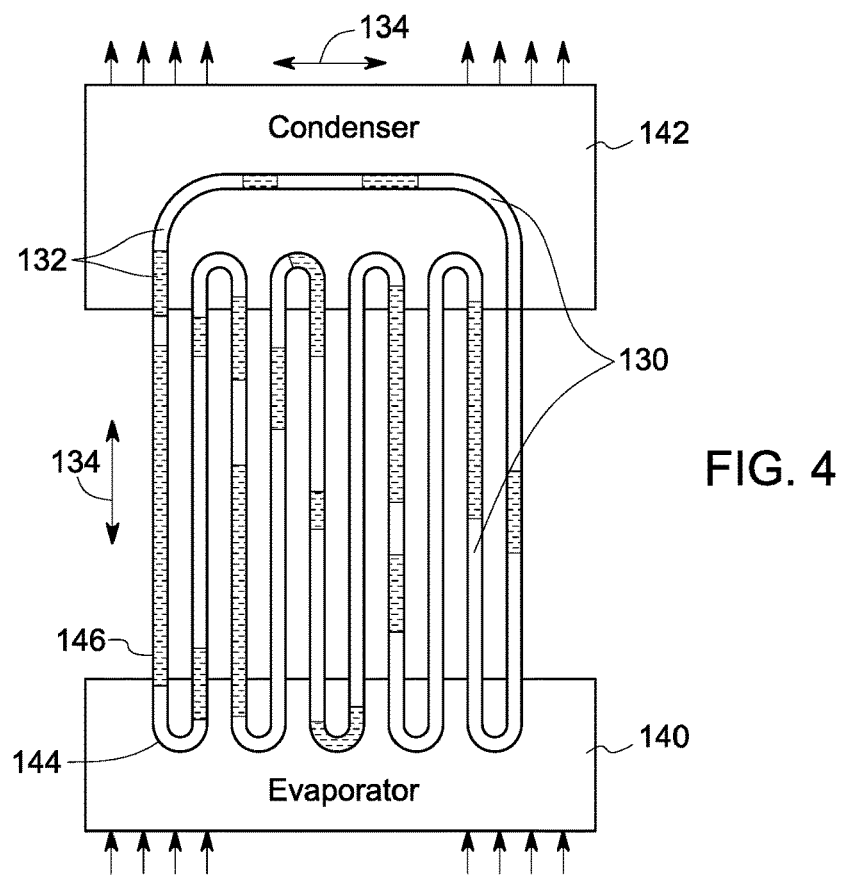
FIG. 4 is a schematic block diagram of a plurality of heat exchange sections of the oscillating heat pipe assembly of FIG. 3, in accordance with aspects of the present technique.

FIG. 3 shows an exploded perspective view of an oscillating heat pipe assembly 124 of FIG. 1 in accordance with one exemplary embodiment of the present technique. The oscillating heat pipe assembly 124 includes casings 126, 128, a plurality of heat exchange sections 130, and a working fluid 132 (as shown in FIG. 4). In one embodiment, heat exchange tubes of the plurality of heat exchange sections 130 are interconnected to define a closed-loop architecture for the oscillating heat pipe assembly 124. At least a portion of the plurality of heat exchange sections 130 is filled in with the working fluid 132 and is disposed within the casings 126, 128. The oscillating heat pipe assembly 124 is later sealed along circumferences of the casings 126, 128 to hermetically seal the heat exchange sections 130. In one embodiment, the working fluid 132 is methane. In some other embodiments, the working fluid 132 may be water, and the like.

The oscillating heat pipe assembly 124 has a length 'L', a width 'W' and a thickness 'T'. It should be noted herein that the thickness "T" of the oscillating heat pipe assembly 124 refers to a thickness derived after assembling the plurality of heat exchange sections 130 within the casing 126, 128. In one example, a suitable thickness of the oscillating heat pipe assembly 124 is in a range from about 15 μm to about 100 μm (i.e. from about 0.66 mils to about 4 mils). The oscillating heat pipe assembly 124 has the thickness "T" significantly less than the width "W" and the length "L". As shown, the oscillating heat pipe assembly 124 has two opposing casings 126, 128. In some embodiments, the casings 126, 128 may contact one or more portions of the component 101 (see FIG. 1). In some other embodiments, the casing 126, 128 may not be in physical contact with the component 101. In such embodiments, the thermal conductivity of the oscillating heat pipe assembly 124 enables heat conduction in the component 101.

In one embodiment, the oscillating heat pipe assembly 124 includes a dielectric material. Specifically, the casings 126, 128 and the plurality of heat exchange sections 130 are made of the dielectric material. In such embodiments, the casings 126, 128 has a first thermal conductivity, the plurality of heat exchange sections 130 has a second thermal conductivity, and the working medium 132 has a third thermal conductivity. In such embodiments, the oscillating heat pipe assembly 124 including the casings 126, 128, the plurality of heat exchange sections 130, and the working medium 132 has a high thermal conductivity that is contributed by individual components of the oscillating heat pipe assembly 124. As noted earlier, the oscillating heat pipe assembly 124 has an in-plane thermal conductivity higher than a through-plane thermal conductivity. As used herein, the term 'in-plane thermal conductivity' refers to the thermal conductivity along a plane i.e., perpendicular to the thickness "T" (for example, along directions 134) of the oscillating heat pipe assembly 124. The term, 'through-plane thermal conductivity' refers to the thermal conductivity through the plane, i.e. along the thickness "T" (for example, along direction 136) of the oscillating heat pipe assembly 124.

In one embodiment, the dielectric material includes at least one of a polyetheretherketone (PEEK), a polyimide, and a PEEK coated on a polymer. The polyimide material may also be known as Kapton®. Advantageously, PEEK and/or the polyimide have a high degree of flexibility with ease of bending/cutting/trimming so as to conform to various shapes of the component 101. Thus, the PEEK and/or the polyimide dielectric material may provide a high degree of flexibility to the oscillating heat pipe assembly 124, thereby allowing the oscillating heat pipe assembly 124 to conform to various desirable shapes of the component 101. In one embodiment, the PEEK material may be coated on the polymer used to manufacture the casings 126, 128 of the oscillating heat pipe assembly 124 so as to hermetically seal the heat exchange sections 130 of the oscillating heat pipe assembly 124.

As used herein, in one embodiment, the term "high thermal conductivity" may be referred to a thermal conductivity above 1 W/m-K. Specifically, the thermal conductivity of the oscillating heat pipe assembly 124 is higher than the inherent thermal conductivity of the adjacent electrical machine elements (i.e., slots, windings, permanent magnet, and resin, etc.). In some embodiments, the thermal conductivity of the oscillating heat pipe assembly 124 is higher than 10 W/m-K. In certain other embodiments where the oscillating heat pipe assembly 124 is made of PEEK and/or the polyimide, the thermal conductivity of the oscillating heat pipe assembly 124 is in a range from about 650 W/m-K to about 1,799 W/m-K.

FIG. 4 shows a schematic block diagram of the plurality of heat exchange sections 130 of the oscillating heat pipe assembly 124 of FIG. 3 in accordance with one exemplary embodiment of the present technique.

As discussed in the embodiment of FIG. 1, the oscillating heat pipe assembly 124 is disposed in the stator core 106, the rotor core, at least one stator slot 110, and at least one rotor slot 118 such that the heat is dissipated from a hot region 140 (evaporator section) to a cold region 142 (condenser section) through oscillating/pulsating motion of the working fluid 132 in the plurality of heat exchange sections 130. In some embodiments, the heat may also be conducted through the casing 126, 128 along the direction 134 (i.e. in-plane) from the evaporator section 140 to the condenser section 142.

In one embodiment, the evaporator section 140 may include the conduction winding 112 and an inner surface (not shown) of the stator core 106 or an outer surface (not shown) of the rotor core 114. The condenser section 142 may include cooling jacket (not shown in FIG. 4), the shaft 122, and an outer surface (not shown) of the stator core 106 or an inner surface (not shown) of the rotor core 114. In one embodiment, at least a portion of the working fluid 132 is evaporated to generate vapor slugs, generally represented by reference numeral 144, and liquid slugs, generally represented by reference numeral 146. The vapor slugs 144 and the liquid slugs 146 are configured to oscillate/pulsate within the plurality of heat exchange sections 130 so as to dissipate the heat from the evaporator section 140 to the condenser section 142. The oscillating heat pipe assembly 124 of the present technique does not require a wick to transport the working fluid 132 between the evaporator section 140 and the condenser section 142 because the working fluid 132 is transported based on oscillation/pulsation of the vapor and liquid slugs 144, 146 and not based on capillary action.

FIG. 5 shows a schematic sectional view of a portion of the electrical machine 100 taken along line 5-5 of FIG. 1 in accordance with one exemplary embodiment of the present technique. The electrical machine 100 includes the component 101, such as the stator 102 and the rotor 104. The rotor 104 is concentrically disposed around the stator 102 such that an air gap 148 is created between the stator 102 the rotor 104. The rotor 104 is further mounted on a shaft 122 and is configured to drive the shaft 122 about a central axis 150 of the electrical machine 100. The stator 102 includes the stator core 106 having an inner surface 152 and an outer surface 154. The electrical machine 100 further includes a cooling jacket 156 disposed on the outer surface 154 of the stator 102. In one embodiment, the conduction winding 112 is disposed in at least one slot of the plurality of stator slots 110 and the permanent magnet 120 is disposed in at least one slot of the plurality of rotor slots 118. Specifically, the conduction winding 112 is wound around at least two stator slots 110. The conduction winding 112 includes an end winding 112a protruding outwardly from at least one slot of the one or more slots 110.

In one example, the stator core 106 is formed by a plurality of laminations sheets 158 disposed adjacent one another. Similarly, in the illustrated embodiment, the rotor core 114 is formed by a plurality of laminations sheets 162 staked one over the other. In one embodiment, the plurality of laminations sheets 158, 162 are glued to each other using resins (not shown in FIG. 5) and the like. Alternatively, in some embodiments, the stator core 106 and/or the rotor core 114 may be formed of a single piece of material.

As illustrated in an expanded view 157, the oscillating heat pipe assembly 124 is inter-disposed between a pair of lamination sheets 158a of the plurality of lamination sheets 158. The oscillating heat pipe assembly 124 is inter-disposed such that at least a portion of the oscillating heat pipe assembly 124 is in contact with the conduction windings 112 and the core 106 and dissipates the heat from the conduction windings 112 to the cooling jacket 156. In the illustrated embodiment, the oscillating heat pipe assembly 124 is shown as being in direct physical contact with the conduction windings 112 and the core 106. However, in alternative embodiments, the oscillating heat pipe assembly 124 may be in an indirect contact with the conduction windings 112 and the core 106. In these embodiments, a thermally conductive element may be disposed between the oscillating heat pipe assembly 124, the conduction windings 112, and the core 106. Although not illustrated, in certain embodiments, the oscillating heat pipe assembly 124 may be disposed along the outer surface 154 of the stator 102 so as to dissipate heat from a center (not labeled) of the stator 102 to peripheral surfaces 151 of the stator 102. In such embodiments, the cooling jacket 156 may be disposed over the oscillating heat pipe assembly 124 to cool the oscillating heat pipe assembly 124.

As illustrated in an expanded view 159, in some embodiments, the oscillating heat pipe assembly 124 includes a first portion inter-disposed 124a between a pair of lamination sheets 160a of the plurality of lamination sheets 160 and a second portion 124b extending along the outer surface 154 of the stator core 106. The second portion 124b is further in contact with the cooling jacket 156. In such embodiments, the oscillating heat pipe assembly 124 is configured to dissipate the heat from the conduction windings 112 to the outer surface 154 and to the cooling jacket 156.

As illustrated in an expanded view 161, in some embodiments, the rotor core 114 may also include a cooling jacket (not shown in FIG. 5) disposed proximate to the shaft 122 to transfer heat from the rotor core 114. In the illustrated embodiment, the oscillating heat pipe assembly 124 is inter-disposed between a pair of lamination sheets 162a of the plurality of lamination sheets 162. The oscillating heat pipe assembly 124 is inter-disposed such that at least a portion of the oscillating heat pipe assembly 124 is in contact with the permanent magnet 120 and dissipates the heat from the permanent magnet 120 to the shaft 122 and/or to the cooling jacket. In one or more embodiments, the conduction windings 112 and the permanent magnet 120 may be referred to as a magnetic field-generating component. It may be noted that the plurality of lamination sheets 158, 160, and 162 may be similar or different in structure, material, and arrangement of respective lamination sheets.

In a conventional component, a phase-separator may be used to electrically insulate at least two phases of the conduction windings disposed in the same slot. Although not illustrated, in some embodiments, instead of the conventional phase-separator the oscillating heat pipe assembly 124 may be disposed in a form of a phase-separator between at least two phases of the conduction windings 112. In such embodiments, the oscillating heat pipe assembly 124 may function as both: i) phase-separator to electrically insulate the at least two phases of the conduction windings 112, and ii) heat dissipater to dissipate heat generated by the at least two phases of the conduction windings 112.

Figure 6:
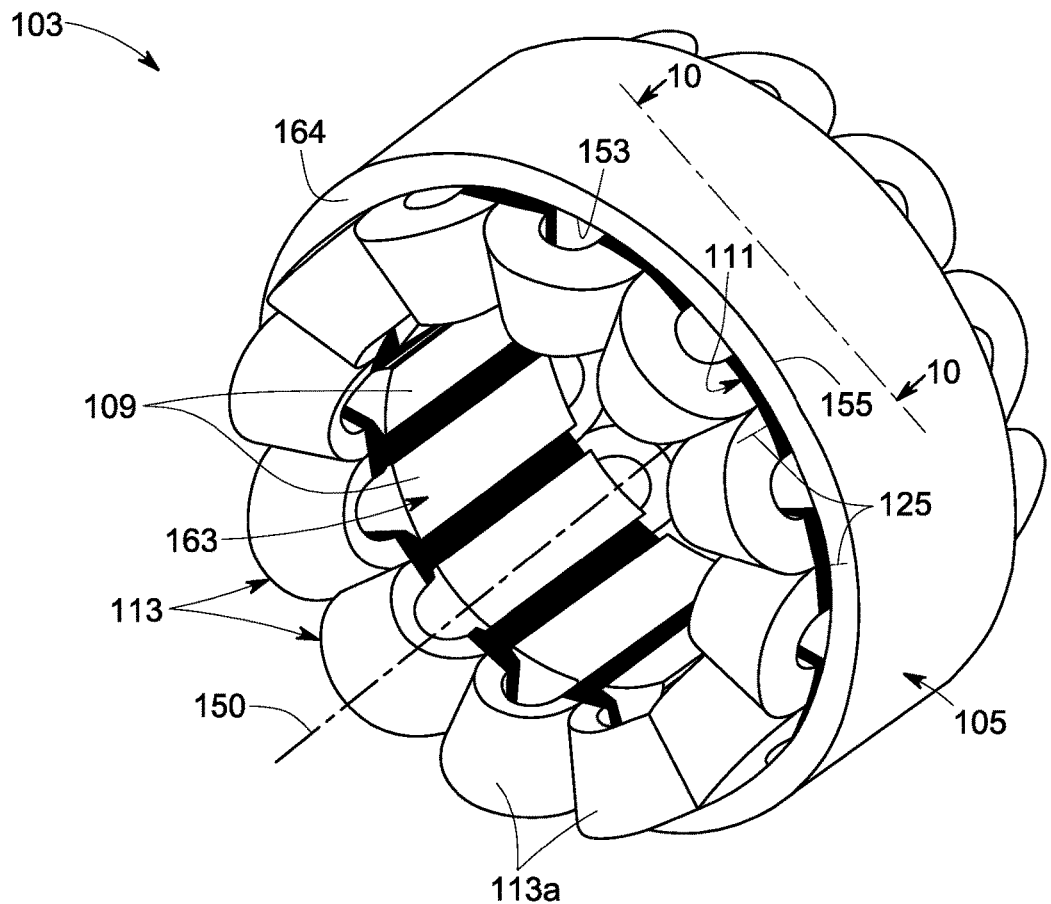
FIG. 6 is a perspective view of a component of an electrical machine, in accordance with aspects of the present technique.

FIG. 6 shows a perspective view of a component 103 of an electrical machine in accordance with one exemplary embodiment of the present technique. It should be noted that the component 103 discussed herein is similar to the component 101 (i.e. the stator 102 and/or the rotor 104) of the electrical machine 100 discussed with reference to FIG. 1.

In the illustrated embodiment, the component 103 has an annular shape. The component 103 includes a core 105 (also referred to as "magnetic core", "stator core", "rotor core") which is configured to generate a magnetic field. The core 105 includes an inner surface 153 and an outer surface 155 and the core defines 105 a central opening 163. In one embodiment, the central opening 163 extends along the central axis 150 of the annular component 103. The core 105 may be formed of a plurality of lamination sheets (not shown) disposed adjacent one another along the central axis 150. In one embodiment, each lamination sheet has an annular shape. As illustrated, the core 105 includes a yoke 164 and teeth 109. In one or more embodiments, the term "yoke" refers to one or both of a peripheral surface of the core 105 and/or cumulative peripheral surfaces of the plurality of lamination sheets of the core 105. The yoke 164 may also be referred to as a stator yoke or a rotor yoke. The teeth 109 extend radially inward (i.e. towards the central axis 150) from the yoke 164. The teeth 109 define a plurality of slots 111 disposed there-between. As used herein, the term "radially" or "radial direction" or "radial axis" refers to a direction along a radius relative to the central axis 150 of the annular component 103. In some embodiments, a cooling fluid may be circulated along the peripheral surface of the yoke 164 or the outer surface 155 of the core 105 to dissipate heat from the core 105. The cooling fluid may include, air, oil, or water, for example, a water-glycol mixture.

The component 103 includes a plurality of magnetic field-generating components 113, where each magnetic field-generating component 113 is disposed between at least two slots of the plurality of slots 111. In the illustrated embodiment, the plurality of magnetic field-generating components 113 includes a conduction winding. The conduction winding 113 is composed of a plurality of coils (not shown) and the conduction winding 113 extends through the slot 111 and is wound around the teeth 109. In other words, the conduction windings 113 has an end winding 113a protruding outwardly from at least one slot of the one or more slots 111 and is wound back into another adjacent slot of the one or more slots 111. In certain embodiments, the conduction winding 113 includes copper winding. The conduction windings 113 may include one or more direct current (DC) coils and/or one or more alternating current (AC) coils. The number of phases of each coil may vary depending on the application. In some embodiments, the conduction winding 113 is insulated using a resin. In certain other embodiments, the conduction winding 113 is composed of a plurality of fractional-slot concentrated coils. The component 103 further includes an oscillating heat pipe assembly 125 disposed in the plurality of slots 111 and the core 105, and in contact with the conduction winding 113.

Figure 7:
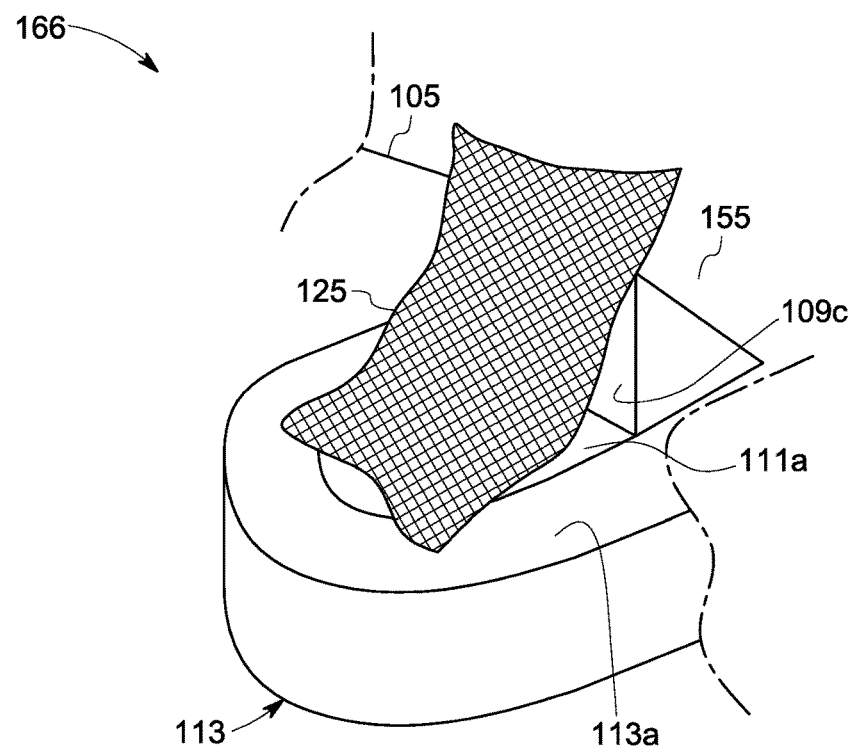
FIG. 7 is a schematic view of a portion of the component of FIG. 6, in accordance with aspects of the present technique.

FIG. 7 shows a schematic view of a portion 166 of the component 103 of FIG. 6 in accordance with one exemplary embodiment of the present technique. The portion 166 includes the core 105, the tooth 109, the slot 111, and the conduction winding 113. In the illustrated embodiment, the conduction winding 113 includes the end winding 113a protruding outwardly from at least one slot of the one or more slots 111 and is wound back into another adjacent slot of the one or more slots 111. The oscillating heat pipe assembly 125 is coupled to the end winding 113a and the core 105. In one embodiment, the oscillating heat pipe assembly 125 is configured to dissipate the heat from the end winding 113a to the core 105. Specifically, the oscillating heat pipe assembly 125 dissipates heat to the outer surface 155 of the core 105 or to the yoke 164 (as shown in FIG. 6).

Figure 8:
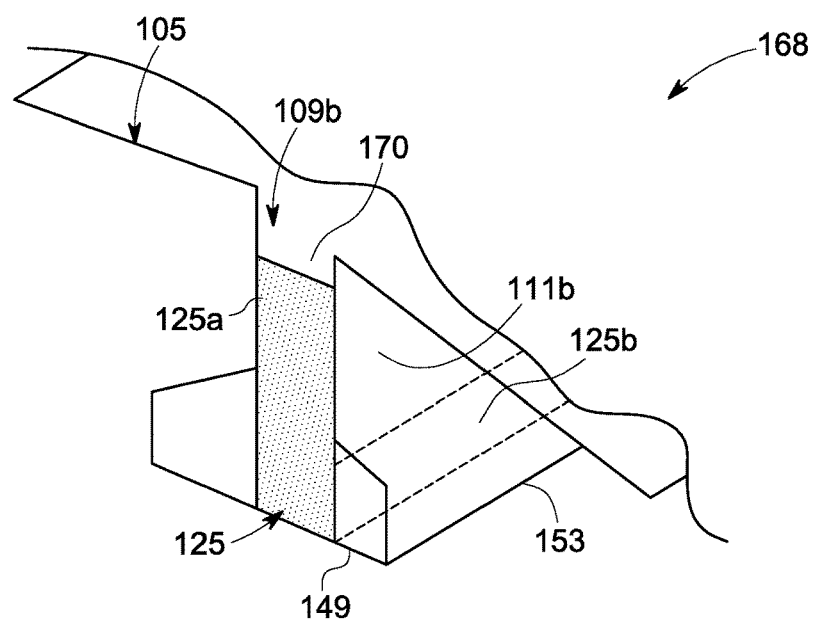
FIG. 8 is a schematic view of another portion of the component of FIG. 6, in accordance with aspects of the present technique.

FIG. 8 shows a schematic view of another portion 168 of the component 103 of FIG. 6 in accordance with one exemplary embodiment of the present technique. The portion 168 includes the core 105, a tooth 109a, and a slot 111a. It should be noted herein that the conduction winding 113 is not shown in the other portion 168 of the component 103 for ease of illustration and such illustration should not be construed as a limitation of the present technique. The oscillating heat pipe assembly 125 includes a first portion 125a coupled to a peripheral surface 170 of at least one tooth 109 (i.e. of yoke 164) and a second portion 125b extending along the inner surface of the core 105. In one embodiment, the oscillating heat pipe assembly 125 is configured to dissipate heat from an air gap 149 to the peripheral surface 170 of the core 105.

Figure 9:
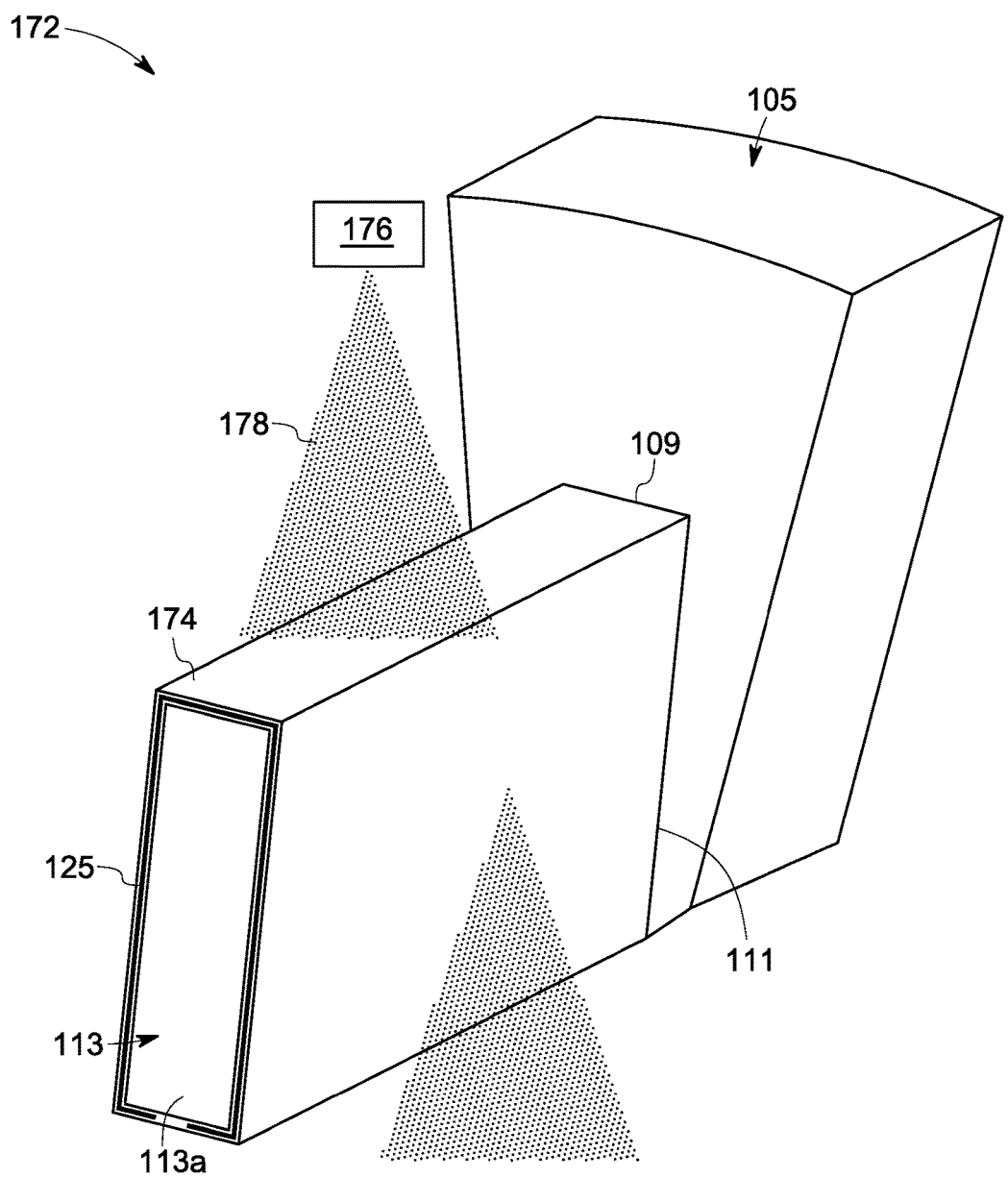
FIG. 9 is a schematic view of yet another portion of the component of FIG. 6, in accordance with aspects of the present technique.

FIG. 9 shows a schematic view of yet another portion 172 of the component 103 of FIG. 6 in accordance with one exemplary embodiment of the present technique. The other portion 172 includes the core 105, a tooth 109b, a slot 111b, and the conduction winding 113. In the illustrated embodiment, the conduction winding 113 extends through the slot 111b and is wound around the teeth 109b. In the illustrated embodiment, the conduction windings 113 has an end winding 113a protruding outwardly from at least one slot of the one or more slots 111b. It should be noted herein that only a portion of the end winding 113a is shown in FIG. 9 for easy of illustration and such illustration should not construed as a limitation of the present technique. The conduction winding 113 includes an insulating winding liner 174 wound around the end winding 113a. In such embodiments, the oscillating heat pipe assembly 125 is disposed within the insulating winding liner 174. The component 103 further includes a sprayer, represented generally by reference numeral 176, disposed proximate to the end winding 113a and is configured to provide a dielectric coolant 178 over the insulating winding liner 174. In some embodiments, the sprayer 176 may be coupled to a casing (not shown in FIG. 9) of the electrical machine. In one embodiment, the insulating winding liner 174 is configured to insulate the end winding 113a so as to prevent short circuit of the conduction windings 113. The oscillating heat pipe assembly 125 and the dielectric coolant 178 are configured to dissipate the heat from the end winding 113a so as to maintain a uniform temperature of the conduction winding 113.

Figure 10:
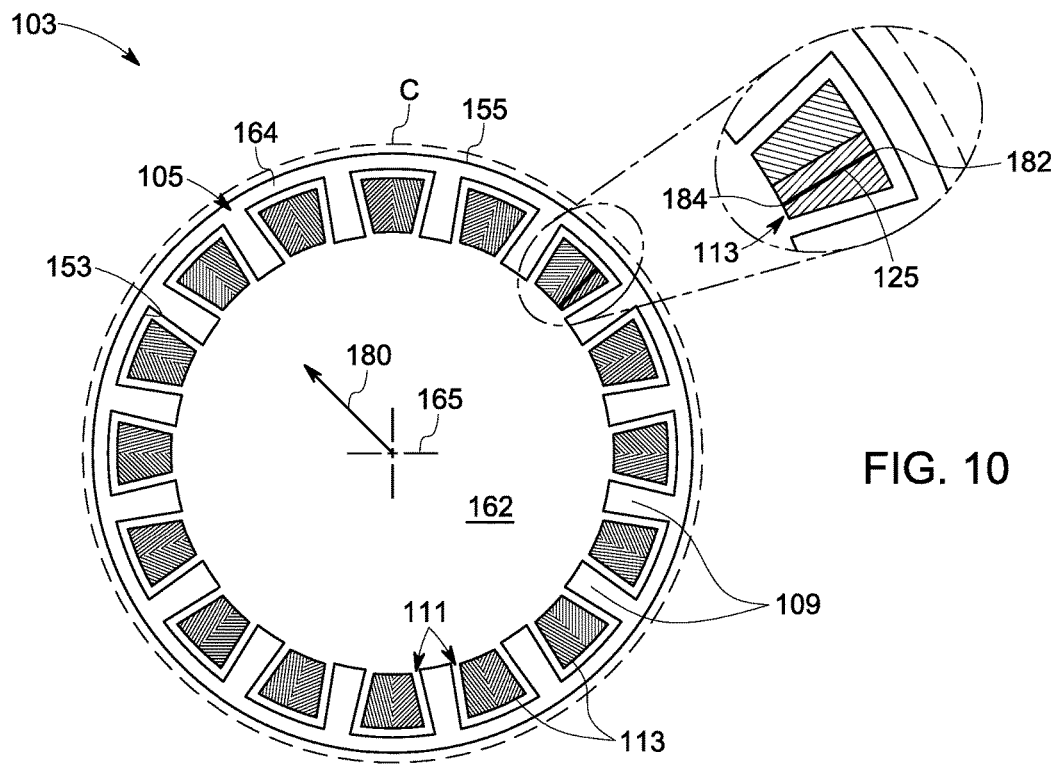
FIG. 10 is a schematic cross-sectional view of the component taken along line 10-10 of FIG. 6, in accordance with aspects of the present technique.

FIG. 10 shows a schematic cross-sectional view of the component 103 taken along line 10-10 of FIG. 6 in accordance with one exemplary embodiment of the present technique. The teeth 109 are arranged radially about the central longitudinal axis 165 such that the teeth 109 are spaced apart from each other along the circumference "C" of the core 105. Each slot 111 extends between corresponding adjacent teeth 109 of the core 105. The number of teeth 109 and slots 111 may vary depending on the application. Further, the number of coils in the conduction winding 113 may also vary depending on the application.

In the illustrated embodiment, the oscillating heat pipe assembly 125 is disposed inside the conduction winding 113 along with the coils. The oscillating heat pipe assembly 125 includes a casing and a plurality of heat exchange sections (as discussed in FIGS. 3 and 4). The oscillating heat pipe assembly 125 is disposed such that a plane of the oscillating heat pipe assembly 125 is substantially parallel to a radial direction 180 of the component 103. As used herein, "substantially parallel" refers to a plane of the oscillating heat pipe assembly 125 that extends parallel to the radial axis 180. In some embodiments, the plane may deviate from about −10 degrees to about 10 degrees from the radial axis 180.

In the illustrated embodiment, a first end 182 of the oscillating heat pipe assembly 125 is disposed proximate to the yoke 164 for dissipating heat to the core 105 and a second end 184 of the oscillating heat pipe assembly 125 is disposed away from the yoke 164 for absorbing the heat from at least one of an air gap (not shown) and from the conduction winding 113. The oscillating heat pipe assembly 125 conducts heat along the substantially radial direction 180 from the conduction winding 113 to the core 105. Specifically, the oscillating heat pipe assembly 125 conducts heat from the second end 184 to the first end 182.

Figure 11:
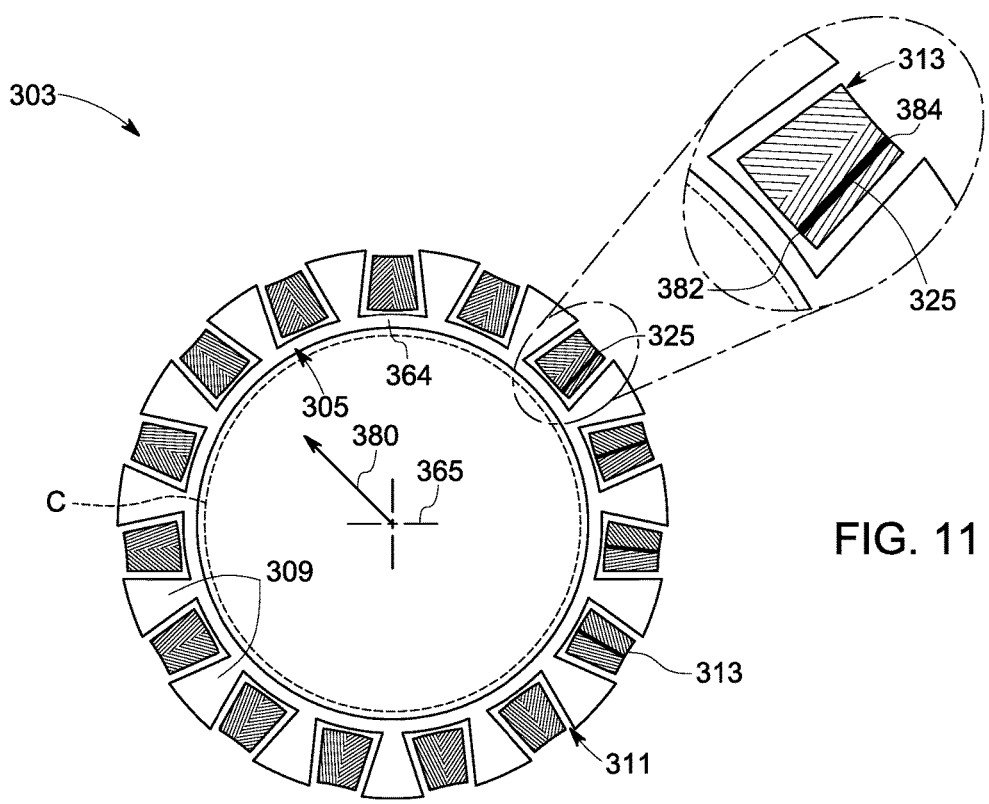
FIG. 11 is a schematic cross-sectional view of a component of an electrical machine, in accordance with aspects of the present technique.

FIG. 11 shows a schematic cross-sectional view of the component 303 in accordance with one exemplary embodiment of the present technique. The component 303 includes elements which are similar to the elements discussed in the embodiment of FIG. 10. In the illustrated embodiment, teeth 309 extend radially outward from a yoke 364 compared to the embodiment in FIG. 10. Each slot 311 extends between corresponding adjacent teeth 309 of the component 303. In the illustrated embodiment, an oscillating heat pipe assembly 325 is disposed in at least one slot of the plurality of slots 311. The oscillating heat pipe assembly 325 is configured to directly contact a conduction winding 313 disposed in the at least slot 311. The oscillating heat pipe assembly 325 conducts heat along the substantially radial direction 380 from the conduction winding 313 to the core 305. Specifically, the oscillating heat pipe assembly 325 conducts heat from the second end 384 to the first end 382.

Figure 12:
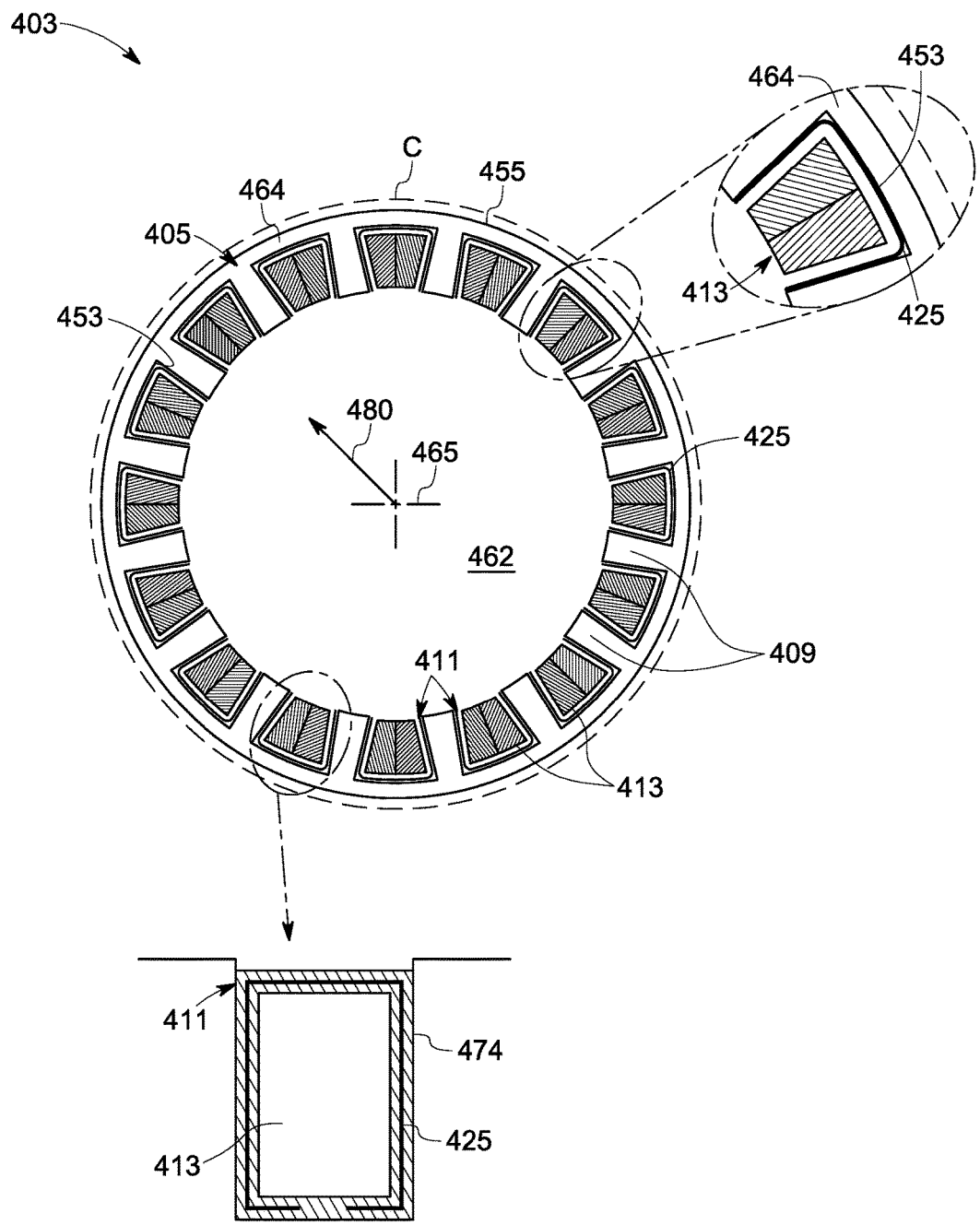
FIG. 12 is a schematic cross-sectional view of another component of an electrical machine, in accordance with aspects of the present technique.

FIG. 12 shows a schematic cross-sectional view of the component 403 in accordance with another exemplary embodiment of the present technique. The illustrated embodiment is similar to the embodiment of FIG. 10 except that an oscillating heat pipe assembly 425 is disposed in a form of a slot liner in at least one slot 411 of the component 403. Specifically, the oscillating heat pipe assembly 425 is disposed along an inner surface 453 of the slot 411. In particular, the oscillating heat pipe assembly 425 conforms to the shape of the slot 411. In some embodiments, the oscillating heat pipe assembly 425 is disposed within the slot 411 and extends along the central longitudinal axis 465. The oscillating heat pipe assembly 425 is configured to dissipate the heat from a conduction winding 413 to a yoke 464.

In some embodiments, the component 403 further includes an insulating slot liner 474 disposed along at least one slot of the plurality of slots 411. The oscillating heat pipe assembly 425 is disposed within the insulating slot liner 474 such that the oscillating heat pipe assembly 425 is disposed between the insulating slot liner 474 and the conduction winding 413. In such embodiments, the oscillating heat pipe assembly 425 is configured to conduct heat from the conduction winding 413 to the core 405 so as to maintain uniform temperature of the electrical machine.

Figure 13:
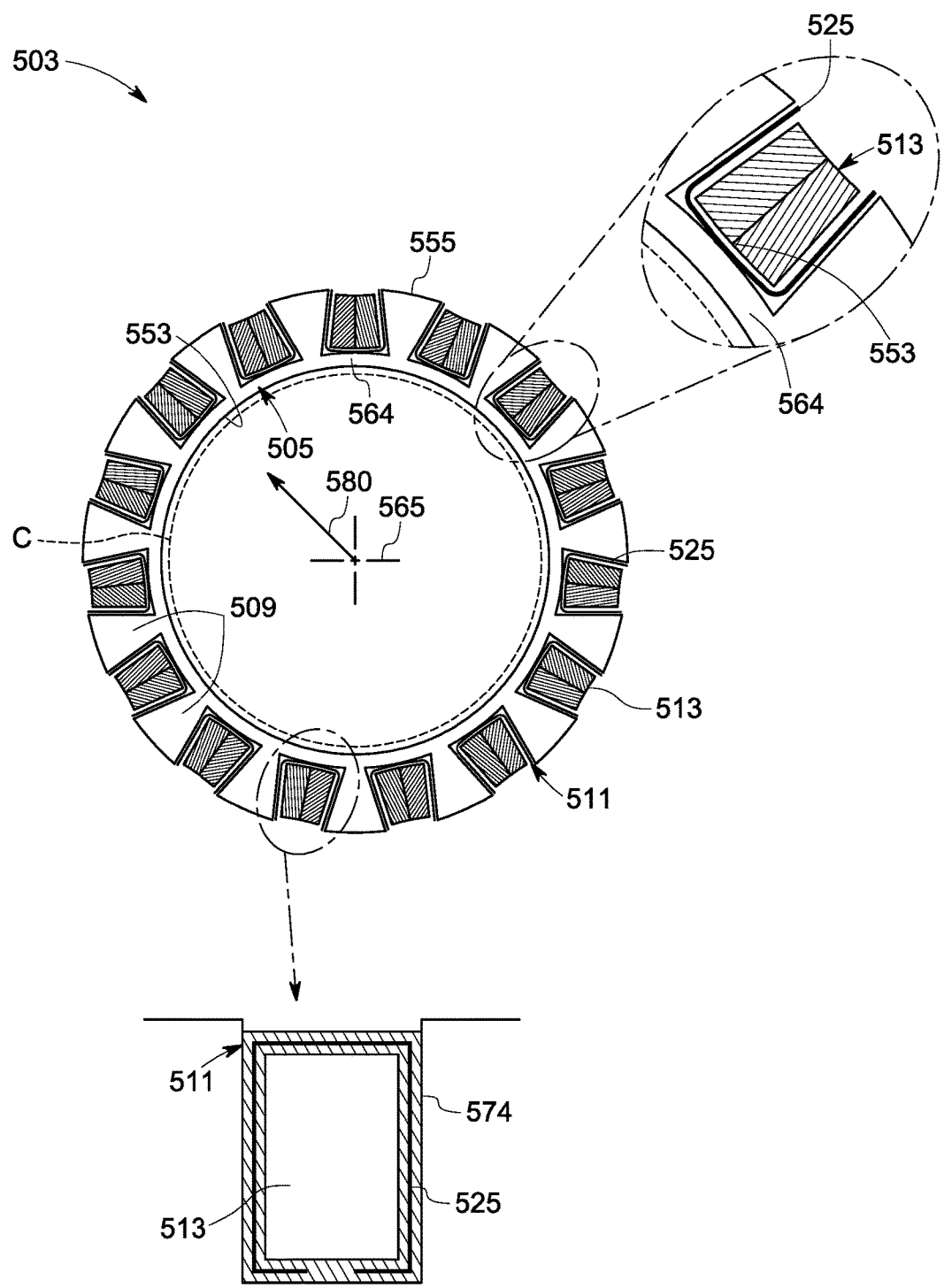
FIG. 13 is a schematic cross-sectional view of yet another component of an electrical machine, in accordance with aspects of the present technique.

FIG. 13 shows a schematic cross-sectional view of the component 503 in accordance with yet another exemplary embodiment of the present technique. The illustrated embodiment is similar to the embodiment of FIG. 11 except that an oscillating heat pipe assembly 525 is disposed in the form of a slot liner in at least one slot 511 of the component 503. In such embodiment, the oscillating heat pipe assembly 525 is configured to insulate a conduction winding 513 disposed in at least one slot 511 and extract heat from the conduction winding 513.

In some embodiments, the component 503 further includes an insulating slot liner 574 disposed along at least one slot of the plurality of slots 511. The oscillating heat pipe assembly 525 is disposed within the insulating slot liner 574 such that the oscillating heat pipe assembly 525 is disposed between the insulating slot liner 574 and the conduction winding 513. In such embodiments, the oscillating heat pipe assembly 525 is configured to conduct heat from the conduction winding 513 to the core 505 so as to maintain uniform temperature of the electrical machine.

Figure 14:
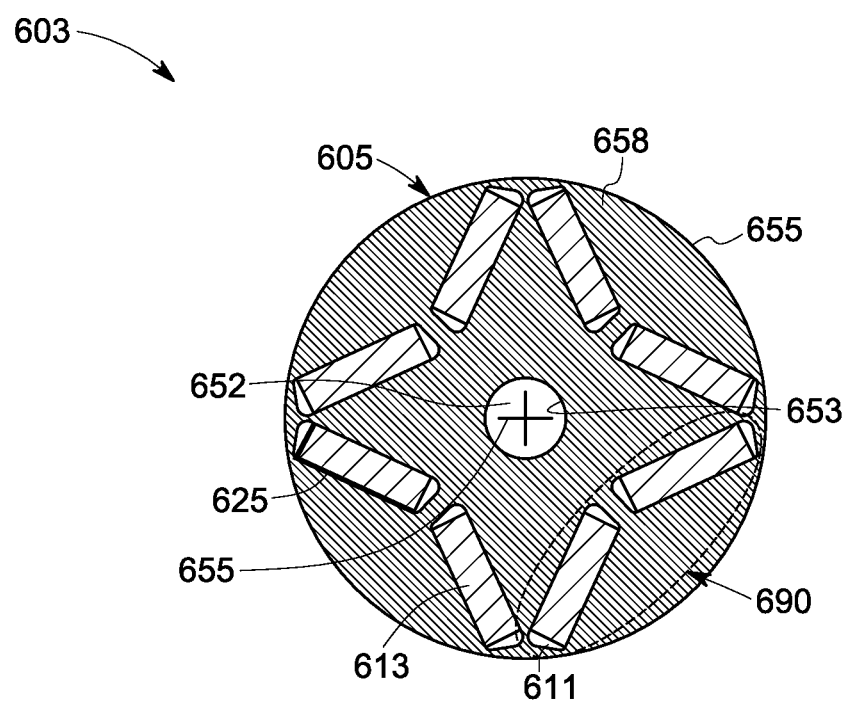
FIG. 14 is a schematic cross-sectional view of an interior permanent magnet rotor, in accordance with aspects of the present technique.

FIG. 14 shows a schematic cross sectional view of a component 603 in accordance with one exemplary embodiment of the present technique. In the illustrated embodiment, the component 603 is an interior permanent magnet rotor. The rotor 603 includes an annular rotor core 605 configured to rotate about a central longitudinal axis 665. The rotor 603 includes a rotor yoke 664 having an outer surface 655 and an inner surface 653 that defines a central opening 652. The rotor core 605 further includes a plurality of poles 690 located within the rotor yoke 658. The rotor core 605 also includes a plurality of slots 611. In one embodiment, a plurality of permanent magnets 613 is disposed within the slots 611 of the rotor core 605. In the illustrated embodiment, the rotor core 605 includes two slots 611 in each of the four quadrants of the annular rotor yoke 658. Two permanent magnets 613 in each quadrant form a pole 690.

In such embodiments, an oscillating heat pipe assembly 625 is disposed on at least one side/surface of the permanent magnets 613. In some embodiments, the oscillating heat pipe assembly 625 is disposed around the permanent magnets 613. In some embodiments, the permanent magnet 613 includes a laminate of thin sheets. In such embodiments, the oscillating heat pipe assembly 625 is disposed between adjacent thin sheets of the laminate.

Figure 15:
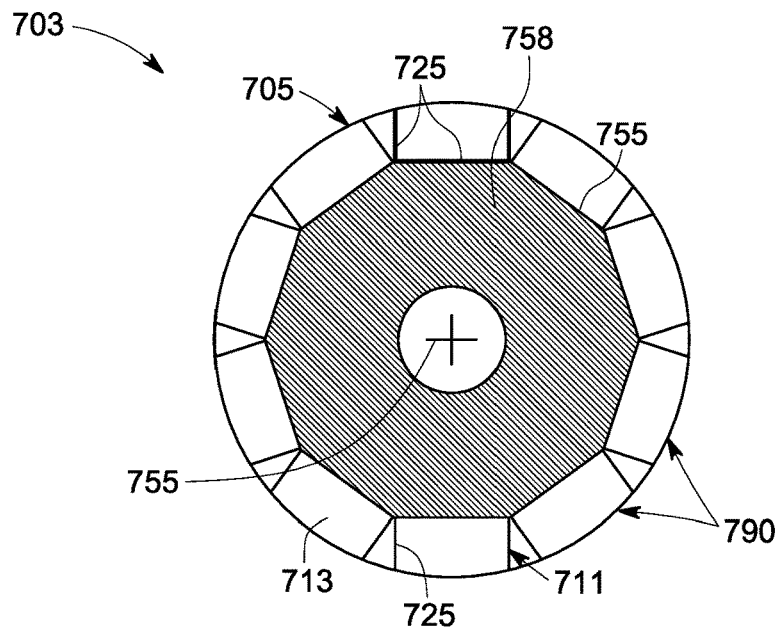
FIG. 15 is a schematic cross-sectional view of a surface permanent magnet rotor in accordance, with aspects of the present technique.

FIG. 15 shows a schematic cross-sectional view of a rotor 703 in accordance with another exemplary embodiment of the present technique. In the illustrated embodiment, the rotor 703 is a surface permanent magnet rotor. A plurality of poles 790 is disposed on an outer surface 755 of the rotor yoke 758. Rotor core 705 includes the plurality of permanent magnets 713 disposed in the plurality of slots 711 formed on the outer surface 755 of the rotor yoke 758. The rotor 703 further includes an oscillating heat pipe assembly 725 disposed in contact with the permanent magnets 713 within the slots 711. In the illustrated embodiment, the oscillating heat pipe assembly 725 is disposed in the form of a slot liner in at least one slot of the plurality of slots 711 of the rotor 703. In some embodiments, the oscillating heat pipe assembly 725 may be disposed on at least one surface of each permanent magnet 713 in the corresponding slot 711.

Figure 16:
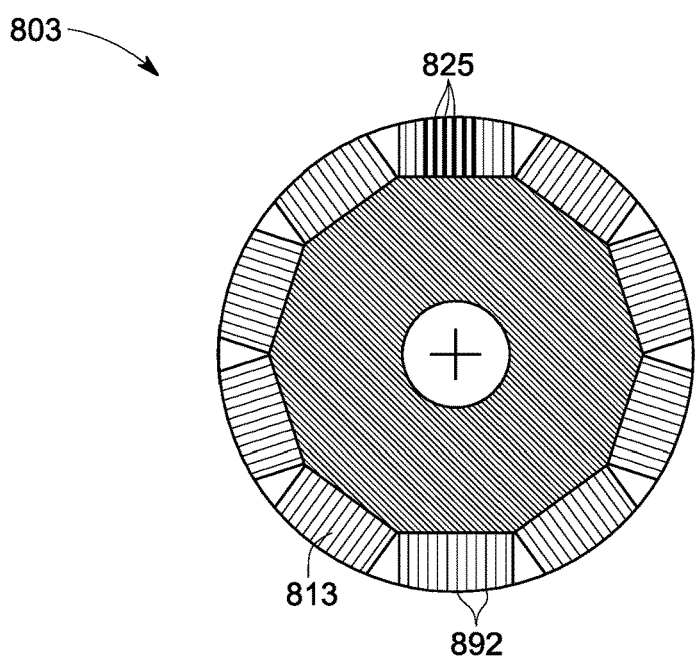
FIG. 16 is a schematic cross-sectional view of a rotor including a magnet of a plurality of thin sheets in accordance, with aspects of the present technique.

FIG. 16 shows a schematic cross-sectional view of a rotor 803 in accordance with another exemplary embodiment of the present technique. In the illustrated embodiment, each permanent magnet 813 includes a laminate having a plurality of thin sheets 892. An oscillating heat pipe assembly 825 is disposed between a pair of thin sheets 892 of the laminate.

In accordance with one or more embodiments discussed herein, an oscillating heat pipe assembly is a flexible heat pipe and is made of a dielectric material having high in-plane conductivity. The oscillating heat pipe assembly of the present technique may be easily bent to conform to various shapes of the component. The dielectric material allows the oscillating heat pipe assembly to be disposed along with the magnetic core without short circuiting the components of the electrical machine. The oscillating heat pipe assembly enhances heat conduction along a desired direction (for example, radial direction) of the component.

While only certain features of embodiments have been illustrated and described herein, many modifications and changes will occur to those skilled in the art. It is, therefore, to be understood that the appended claims are intended to cover all such modifications and changes as falling within the spirit of the invention.

The invention claimed is:

1. A component of an electrical machine, the component comprising:
   a core comprising a plurality of slots;
   a magnetic field-generating component disposed in at least one slot of the plurality of slots; and
   an oscillating heat pipe assembly disposed in the core and the at least one slot of the plurality of slots, wherein the oscillating heat pipe assembly is in contact with the core and the magnetic field-generating component, wherein the oscillating heat pipe assembly comprises a dielectric material, wherein the magnetic field-generating component comprises a permanent magnet, wherein the permanent magnet comprises a plurality of thin sheets, and wherein the oscillating heat pipe assembly is inter-disposed between a pair of thin sheets of the plurality of thin sheets.

2. The component of claim 1, wherein the dielectric material comprises at least one of a polyetheretherketone (PEEK), a polyimide, and a PEEK coated on a polymer.

3. The component of claim 1, wherein the oscillating heat pipe assembly comprises a casing, a plurality of heat exchange sections interconnected to one another and disposed in the casing, and a working fluid filled in at least a portion of the plurality of heat exchange sections.

4. The component of claim 1, wherein the core comprises a plurality of lamination sheets disposed adjacent one another, and wherein the oscillating heat pipe assembly is inter-disposed between a pair of lamination sheets of the plurality of lamination sheets.

5. The component of claim 1, wherein the core comprises a plurality of lamination sheets disposed adjacent one another, wherein the core further comprises an outer surface and an inner surface, and wherein the oscillating heat pipe assembly comprises a first portion inter-disposed between a pair of lamination sheets of the plurality of lamination sheets and a second portion extending along the outer surface of the core.

6. The component of claim 1, wherein the core comprises an outer surface and an inner surface, wherein the core further comprises teeth defining the plurality of slots, wherein each slot of the plurality of slots is defined between corresponding pair of adjacent teeth, and wherein the oscillating heat pipe assembly comprises a first portion coupled to at least one tooth and a second portion extending along the inner surface of the core.

7. The component of claim 1, wherein the oscillating heat pipe assembly is disposed in a form of a slot liner in at least one slot of the plurality of slots.

8. The component of claim 1, wherein at least one slot of the plurality of slots comprises an insulating slot liner, and wherein the oscillating heat pipe assembly is disposed within the insulating slot liner.

9. The component of claim 1, wherein the magnetic field-generating component further comprises a conduction winding, wherein the oscillating heat pipe assembly is disposed within the conduction winding.

10. The component of claim 1, wherein the magnetic field-generating component further comprises a conduction winding, wherein the conduction winding comprises an end winding protruding outwardly from at least one slot of the plurality of slots, and wherein the oscillating heat pipe assembly is coupled to the end winding and the core.

11. The component of claim 1, wherein the component is a rotor.

12. The component of claim 1, wherein the component is a stator.

13. A component of an electrical machine, the component comprising:
a core comprising a plurality of slots;
a magnetic field-generating component disposed in at least one slot of the plurality of slots, wherein the magnetic field-generating component comprises a conduction winding, wherein the conduction winding comprises an end winding protruding outwardly from at least one slot of the plurality of slots, wherein the end winding comprises an insulating winding liner;
an oscillating heat pipe assembly disposed in the core and the at least one slot of the plurality of slots, wherein the oscillating heat pipe assembly is in contact with the core and the magnetic field-generating component, wherein the oscillating heat pipe assembly comprises a dielectric material, wherein the oscillating heat pipe assembly is disposed within the insulating winding liner; and
a sprayer disposed proximate to the end winding and configured to provide a dielectric coolant over the insulating winding liner.

14. The component of claim 13, wherein the dielectric material comprises at least one of a polyetheretherketone (PEEK), a polyimide, and a PEEK coated on a polymer.

15. The component of claim 13, wherein the component is a rotor.

16. The component of claim 13, wherein the component is a stator.

17. An electrical machine comprising:
a stator, wherein the stator comprises a stator core comprising a plurality of stator slots and a conduction winding disposed in at least one slot of the plurality of stator slots;
a rotor, wherein the rotor comprises a rotor core comprising a plurality of rotor slots and a permanent magnet disposed in at least one slot of the plurality of rotor slots;
an oscillating heat pipe assembly disposed in the stator core, the at least one slot of the plurality of stator slots, the rotor core, and the at least one slot of the plurality of rotor slots, wherein the oscillating heat pipe assembly is in contact with the stator core, the rotor core, the conduction winding, and the permanent magnet, wherein the oscillating heat pipe assembly comprises a dielectric material,
wherein the conduction winding comprises an end winding protruding outwardly from at least one slot of the of the plurality of stator slots, wherein the end winding comprises an insulating winding liner, and wherein the oscillating heat pipe assembly is disposed within the insulating winding liner; and
a sprayer disposed proximate to the end winding and configured to provide a dielectric coolant over the insulating winding liner.

18. The electrical machine of claim 17, wherein the permanent magnet comprises a plurality of thin sheets, and wherein the oscillating heat pipe assembly is inter-disposed between a pair of thin sheets of the plurality of thin sheets.

* * * * *